United States Patent [19]

Sugden, Jr.

[11] 3,783,248

[45] Jan. 1, 1974

[54] PARITY CHECK FOR TURBINE METER ELECTRONIC COUNTING INSTRUMENTATION OR THE LIKE

[75] Inventor: Harry Sugden, Jr., Statesboro, Ga.

[73] Assignee: Emerson Electric Co., St. Louis, Mo.

[22] Filed: June 25, 1971

[21] Appl. No.: 156,688

[52] U.S. Cl............... 235/92 FL, 73/3, 73/299, 235/92 R, 235/92 MT, 307/66
[51] Int. Cl............... G01f 1/06, G06f 25/00
[58] Field of Search............... 235/92 FL, 92 EA, 235/92 B, 92 EC, 92 MT; 73/197, 229, 194 E, 3; 307/66

[56] References Cited
UNITED STATES PATENTS

| 3,171,952 | 3/1965 | Brown | 235/92 MT |
| 3,517,308 | 6/1970 | Mirdadian | 73/3 |
| 3,609,386 | 9/1971 | Patlach | 307/66 |
| 3,092,991 | 6/1963 | Thompson | 235/92 FL |
| 3,254,523 | 6/1966 | Fisher et al. | 235/92 FL |

Primary Examiner—Paul J. Henon
Assistant Examiner—Joseph M. Thesz, Jr.
Attorney—Philip B. Polster et al.

[57] ABSTRACT

This invention provides a system separate and independent from the normal high frequency turbine meter signal circuit to yield a parity check signal. A pick-up separate from the normal pick-up collects a low frequency signal and records it on a locally mounted totalizer. A self-contained power system provides continuous output in case of failure of the main power system.

10 Claims, 3 Drawing Figures

PATENTED JAN 1 1974　　　　　　　　　3,783,248

INVENTOR:

HARRY SUGDEN JR.

BY: Polster and Polster

3,783,248

PARITY CHECK FOR TURBINE METER ELECTRONIC COUNTING INSTRUMENTATION OR THE LIKE

BACKGROUND OF THE INVENTION

This invention relates to turbine flow meters. Turbine flow meters consist generally of a flow tube, a rotor assembly including a rotor which rotates at a rate which is generally proportional to the velocity of the fluid through the flow tube, and a transducer assembly which produces elctrical pulses in response to rotation of the rotor.

Turbine flow meters are used in a wide variety of applications, because of their accuracy and adaptability to a wide variety of flow conditions, and because their output is easily totalized to provide total volume of flow information and is easily converted by a frequency to D. C. read-out instrument to provide rate of flow information. Typical applications are in high volume pipelines and in industrail batch processes.

Presently, known turbine flow meters areperiodically checked for accuracy and reproducibility by one of several available procedures. Frequently, two transducer pick-ups may then be checked by comparison. The counting instrument may likewise be checked by providing a duplicate counter, and wiring may be checked by providing duplicate wiring, and so on. The criticality of maintaining accurate metering in many of the applications in which turbine meters are used justifies the additional cost of providing duplicate instrumentation.

Another limitation of presently known turbine flow meters has been that their reliance on electrical transducers has made them inoperative whenever their power source has failed. This characteristic has required that the flow which they meter be either shut off during periods of power failureor allowed to continue unmetered.

One of the objects of this invention is to provide instrumentation for a turbine meter or the like which permits checking of the meter without duplication of costly instrumentation.

Another object is to provide such instrumentation which may be installed in existing meters with minimal modification of the meter.

Still another object is to provide such instrumentation which provides flow totalizing independent of the primary flow sensing circuitry and, when needed, independent of the primary flow sensor power supply.

Other objects will become apparent to those skilled in the art in the light of the following description and accompanying drawings.

SUMMARY OF THE INVENTION

In accordance with this invention, generally stated, a turbine flow meter is provided, including a flow tube, a rotor assembly including a rotor rotatably mounted in the flow tube, a transducer for producing electrical pulse in response to rotation of the rotor, and a source of electricity for powering the transducer, in which a parity check is provided for producing an output signal in response to rotation of the rotor independent of the first transducer. The parity check comprises second transducer means for producing electrical pulses in response to rotation of the rotor, totalizing means for displaying a number derived from the total number of pulses over an extended period of time, and means, independent of the first source of electricity at least when the first source of electricity falls below a predetermined value, for powering the second transducer continuously during operation of the meter. In the preferred embodiment, the rotor includes means coopertive with the first transducer for producing a plurality of electrical pulses for each revolution of the rotor aneother means cooperative with the second transducer for producing a lesser number of pulses for each revolution of the rotor. Also in the preferred embodiment, the rotor includes a shroud including a plurality of elements coopertive with the first transducer, all lying in the same plane perpendicular to the flow axis, and also including an auxiliary element extneding downstream, cooperative with the second transducer. Also in the preferred embodiment, the second transducer includes a circuit connected to the first source of electricity and a battery in the circuit, the battery being connected to be charged by the first source of electricity when the first source of electricity is energized above the predetermined value and to power the second transducer circuit when the source of electricity falls below the predetermined value. Also in the preferred embodiment, the totalizer is an electro-optical numeric display mounted on the flow tube.

DESCRIPTION OF THE PREFERRED EMBODIMENT

Figure 1:
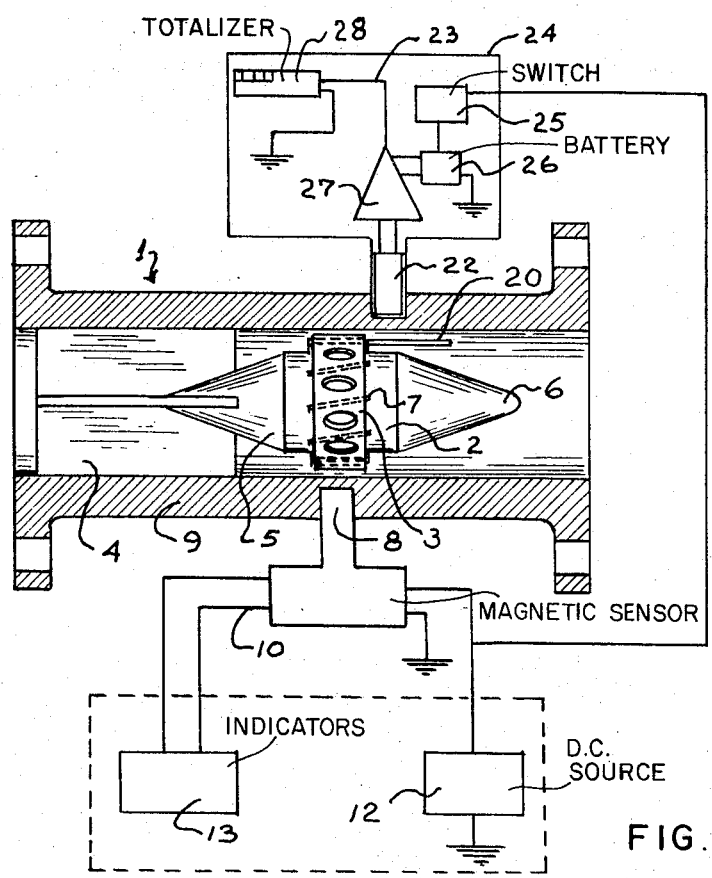
FIG. 1 is a somewhat diagrammatic view of a turbine flow meter embodying the parity check of this invention.
Figure 2:
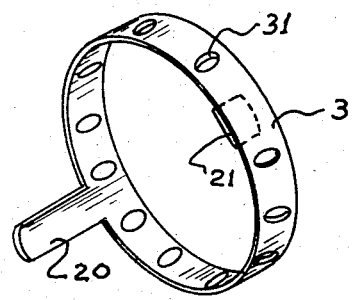
FIG. 2 is a view in perspective of a rotor shroud for use in the device of FIG. 1.

Referring now to the drawings, reference numeral 1 indicates a turbine flow meter embodying the improved parity check of this invention. The meter 1 includes a rotor 2 having a shroud 3 attached to its periphery. The rotor 2 is rotatably supported by a cantilevered structure including a support 4, an upstream support cone 5 and a downstream cone 6. The rotor blades 7 are proportioned and positioned to provide one revolution of the rotor 2 for a given predetermined volume of fluid flowing through the meter 1. This construction is well known in the art. The shroud 3 is conventionally provided with a plurality of oles 31 which provides a differential magnetic shunt for a transducer sensing head 8 mounted in the wall of the flow tube 9 of the meter 1. The magnetic sensor 8 produces a train of impulses in a sensing circuit 10 as the shroud holes 31 rotate past it. The circuit 10 is powered by direct current source 12, which may be at any predetermined voltage, such as 1 volts. The circuit 10 also includes indicators 13 such as totalizers and frequency to D.C. converters (flow rate indicators). This arrangement is also well known in the art.

MOunted on the shroud 3 is a tab 20, which extends downstream of the shroud 3. Mounted on the other side of the shroud 3, diagonally opposite the tab 20, is a counterweight 21 to retain the dynamic balance of the rotor 2. Mounted in the wall of the flow tube 9, downstream of the sensor 8, is a second sensor 22, positioned to provide a pulse in a second transducer circuit 23, whenever the tab 20 passes it. The sensor 22 and circuit 23 form part of a second transducer 24 mounted on the flow tube 9. The circuit 23 also includes a charging switch 25 and a battery 26, as well as an amplifier 27 and a totalizer 28. This circuit is shown in more detail in FIG. 3.

Figure 3:
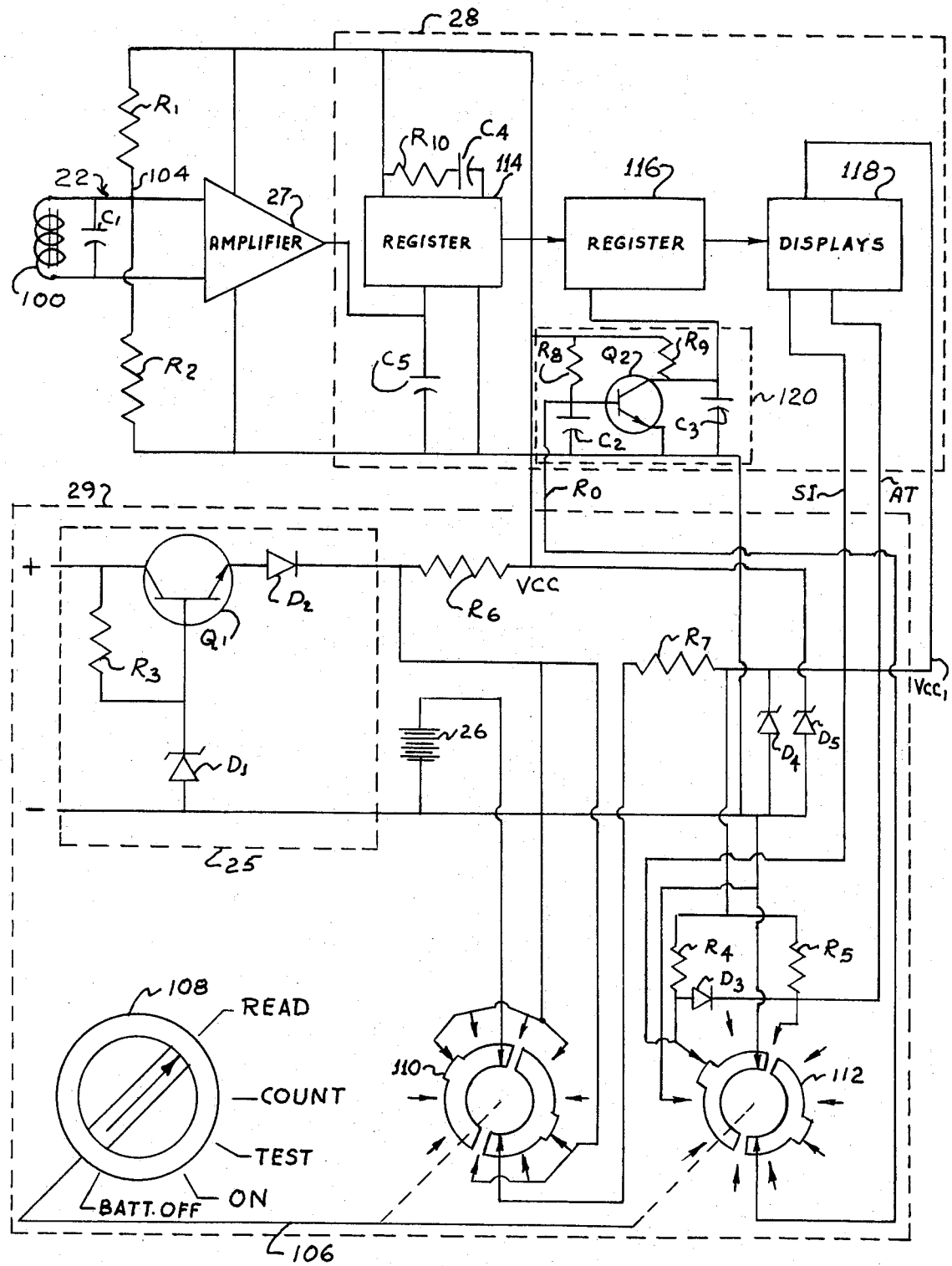
FIG. 3 is a diagrammatic representation of the circuitry of the second transducer of the device of FIGS. 1 and 2.

As shown in FIG. 3, the sensor 22 includes a magnetic pick-up 100, which may be mounted to the exterior of the flow tube in any known manner, a filtering capacitor $C_1$, and a low voltage power source 104 including a pair of resistors $R_1$ and $R_2$ connected respectively to a voltage source $V_{CC1}$ (5 volts DC) and to ground.

The charging switch 25, as shown in FIG. 3, may simply be a standard solid state voltage regulator including a transistor $Q_1$, a resistor $R_3$ and zener diode $D_1$ for maintaining proper bias of the transistor $Q_1$, and a diode $D_2$. The voltage regulator 25 is designed to provide a voltage equal to, or slightly greater than, the voltage of the battery 26. Therefore, the battery will remain charged so long as power is supplied through the switch 25. The battery 26 is connected in parallel with the switch 25 in four of the positions of a five-position, ganged double function switch 106. The function switch 106 includes a position indicator 108, a first rotor 110 and a second rotor 112. The five positions of the switch 106 are labeled, respectively, "read," "count," "test", "on", and "battery off."

The first rotor 11 performs two functions: connection of the battery 26, in all positions of the switch 106 except the "battery off" position of the charging switch 25, nd connection of a line $V_{CC1}$ (swithced controlled voltage, 5 volts DC), in the "read", "count" and "test" positions of the switch 106 to the charging switch 25.

The second rotor 112 selectively applies a small biasing voltage to a pair of lines SI" and "AT," and shunts the lines SI, AT and RO to ground. In the "read" position, the line SI is shunted to ground by the rotor 112. In the "count" and "on" positions, none of the lines is shunted, in the "test" position both the lines SI and AT are shunted and in the "battery off" position only the line RO is shunted. A pair of resistors $R_4$ and $R_5$ and a diode $D_3$ provide the desired voltage and switching characteristics for the lines SI and AT. A pair of resistors $R_6$ and $R_7$ and zener diodes $D_5$ and $D_4$ provide the desired controlled voltage for the lines $V_{CC}$ and $V_{CC1}$ respectively. The circuitry between the input to the switch 25 and the output lines $V_{CC}$, $V_{CC1}$, SI, AT and RO makes up a power supply 29 for the second transducer 24.

The totalizer 28 is an electro-optical numeric display including a first register 114, a bank of registers 116 for storing the output of the amplifier 27 and register 114 in decimal form, and a bank of electronic display elements 118 for displaying the numbers stored in the registers 116. Th totalizer 28 also includes a reference 120 connected to the battery of registers 116. The reference 120 includes a transistor $Q_2$, the base of which is connected to line RO, the emitter of which is connected to ground, and the collector of which is connected to the battery of registers 116. The base of the transistor $Q_2$ is also connected to the line $V_{CC}$ through a resistor $R_8$ and to ground through a capacitor $C_2$. The collector of the transistor $Q_2$ is also connected to the line $V_{CC}$ through a resistor $R_9$ and to ground through a capacitor $C_3$.

The lines AT, SI and $V_{CC1}$ are connected to the display elements 118 to provide the following functions. In the "read" position of the switch 106 (AT energized, SI shunted) the display elements 118 will show the number stored therein at the time the switch is turned to the "read" position. In the "count" position (both lines SI and AT energized) the display elements will show the number contained in the register bank 116 as this number is developed. In the "test" position (both lines SI and AT shunted) the display will show all of its display numbers simultaneously, thereby indicating the proper working condition of the display elements. In the "on" position, which is the normal operating position for the switch, the lines AT and SI are energized, bu the line $V_{C1}$ is disconnected. Therefore, the display elements are de-energized but the registers 116 continue to totalize the pulses received from the sensing element 22, amplifier 27 and register 114. It will be seen that in any of the foregoing positions of the function switch 106, the registers 116 will continue to totalize the pulses received regardless of what is shown by the display 118. Should the main power supply fail while the function switch 106 is in any of the foregoing positions, the battery 26 will continue to supply regulated power to the transducer 24. It will be noticed that in the normal "on" position the power requirements are minimal, hence the device will continue to operate for extended perios of time using battery power. The small power requirements stem not only from the small number of solid state devices being operated by the battery, but also from the low frequency of the signal sensed by the sensor 22 and the minimal power requirement of the sensor and counting circuit in a quiescent state.

It will be seen that with the use of the totalizer of this invention, several checks on the operation of the flow meter may be made. For example, the simplest test, and the only one generally needed, will consist merely in leaving the parity check 24 in the "on" position and periodically checking the total accumulated (by switching to the "count" or "read" position) against the total indicated by the primary indicators 13. However, other testing systems will readily occur to those skilled in the art. For example, the gating system disclosed by Brown in U. S. Pat. No. 3,171,952, utilized on a different type of flow meter, may be adapted for use in a turbine meter by the use of the parity check of this invention.

Merely by way of example, the values of the various components may be as shown in the following table:

| | |
|---|---|
| Battery | 6 Volts |
| $Q_1$ | MJE3055 |
| $Q_2$ | 2N3415 |
| $R_1$ | 4.5 K ohms |
| $R_2$ | 1 K ohm |
| $R_3$ | 39 ohms |
| $R_4$ | |
| $R_5$ | 10 K ohms |
| $R_6$ | 6.5 ohms |
| $R_7$ | 1 ohm |
| $R_8$ | 10 K ohms |
| $R_9$ | 360 ohms (sized for register fan-out) |
| $R_{10}$ | 10 K ohms (sized for maximum frequency) |
| $C_1$ | 0.33 μ |
| $C_2$ | 0.33 μ |
| $C_3$ | 0.33 μ |
| $C_4$ | 1 μf (sized for maximum frequency) |
| $C_5$ | 4 μf |
| $D_1$ | 1N5343 |
| $D_2$ | 10B4 0 |
| $D_3$ | TS-2 |
| $D_4$ | 1N5337 |
| $D_5$ | 1N5337 |
| Register 114 | SN74121N |
| Register 116 | SN7490N (duplicated to provide |

| Display | desired fan-out) 5916L and S-90 (equal to number of registers 116) |

Connection of the amplifier is made to provide 50/50 DC, according to well-known techniques. The various connections to the registers 114 and 116 and displays 118 to provide optical read-out are conventional.

It will be seen that the illustrative parity check provides a means for checking the primary transducer and its associated equipment as well as continuing the totalizing function of the meter even under conditions of failure of the main power supply. The check requires only simple modification of presently existing meter designs and does not affect the design of existing transducer assemblies. Because the resolution of the parity check may be orders of magnitude less than that required for the primary transducer, the parity check may be far simpler than the primary transducer. Numerous variations in the parity check of this invention, within the scope of the appended claims, will occur to those skilled in the art in the light of th foregoing description and accompanying drawings.

Having thus described the invention, what is claimed and desired to be secured by letters Patent is:

1. A turbine flow meter comprising:
   a a flow tube;
   b a rotor assembly, said rotor assembly including a rotor positioned entirely within said flow tube for rotation in response to the flow of a fluid through said flow tube;
   c pulse producing means for producing a first set of electrical pulses in response to rotation of said rotor, said pulse producing means including
      1 a first set of elements on said rotor within said flow tube, and
      2 means responsive to said first set of elements for producing said first set of electrical pulses in response to rotation of said rotor;
   d parity check means for producing a second set of electrical pulses in response to rotation of sai: rotor, the number of pulses pRoduced by said parity check means in response to each revolution of said rotor being a fraction of the number of pulses produced by said pulse producing means in respone to each revolution of said rotor, said parity check means comprising
      1 a second set of elements on saidotor within said flow tube, said second set of elements including at least one element and fewer elements than said first set of elements, and
      2 means responsive only to said second set of elements for producing said second set of lectrical pulses in response to rotation of said rotor;
   e a first indicator responsive to said first set of electrical pulses;
   f a second indication responsive to said second set of electrical pulses.

2. The turbine flow meter of claim 1 wherein said first set of elements on said rotor lies generally in a common plane perpendicular to the long axis of said flow tube, said second set of elements comprises an auxiliary element lying out of said plane, said means responsive to said first set of elements comprise a first magnetic sensor, and said means responsive to said second set of elements comprise a second magnetic sensor.

3. A turbine flow meter of claim 2 wherein said first set of elements and said second set of elements are provided in a shroud part around the periphery of said rotor.

4. The turbine flow meter of claim 3 wherein said second set of elements comprises a single tab extending downstream from said plane.

5. A turbine flow meter comprising:
   a a flow tube; b a rotor assembly, said rotor assembly including a rotor positioned entirely within said flow tube for rotation in response to the flow of a fluid through said flow tube;
   c pulse producing means for producing a first set of electrical pulses in response to rotation of said rotor;
   d indicator means electrically connected to said pulse producing means for displaying a number derived from said first set of electrical pulses;
   e first power source means for powering said pulse producing means and said indicator means;
   f parity check means for producing a second set of electrical pulses in response to rotation of said rotor, the number of pulses produced by said parity check means in response to each revolution of said rotor being a fraction of the number of pulses produced by said pulse producing means in respnse to each revolution of said rotor;
   g totalizing means electrically connected to said parity check means for storing a number derived from the total number of said second set o pulses over an extended period of time;
   h second power source means for powering said parity check means and said totalizing means;
   i battery means for providing electrical energy to said parity check means and said totalizing means when said second power source means falls below a predetermined value; and
   j means electrically isolating said battery means from said pulse producing means, said indicator eans and said first powe source means, at least when said second electrical power source falls below said predetermined value.

6. The turbine flow meter of claim 5 wherein said second power source means are electrically connected to said first power source means, said battery means being connected to be charged by said second power source means when said second power source means are energized above said predetermined value.

7. The turbine flow meter of claim 5 including mounting means for mounting said parity check means and said totalizing means on said flow tube.

8. The turbine flow meter of claim 5 including electro-optical display means for optically displaying said number stored by said totalizing means, and also including electrical switch means for selectively activating said display means.

9. The turbine flow meter of claim 5 wherein said pulse producing means comprises a first set of elements on said rotor within said flow tube, and means responsive to said first set of elements for producing said first set of electrical pulses in response to rotation of said rotor; and wherein said parity check means comprise a second set of elements on said rotor within said flow tube, said second set of elements including at least one element and fewer elements than said first set of elements, and means responsive only to said second set of elements for producing said second set of electrical pulses in respnse to rotation of said rotor.

10. The turbine flow meter of claim 9 wherein said first set of elements on said rotor lies generally in a common plane perpendicular to the long axis of said flow tube, said second set of elements comprises an auxiliary element lying out of said plane, said means responsive to said first set of elements comprise a first magnetic sensor, and said means responsive to said second set of elements comprise a second magnetic sensor.

* * * * *

UNITED STATES PATENT OFFICE
CERTIFICATE OF CORRECTION

Patent No. 3,783,248            Dated January 1, 1974

Inventor(s)      Harry Sugden, Jr.

It is certified that error appears in the above-identified patent and that said Letters Patent are hereby corrected as shown below:

Col. 1, line 11, "elctrical" should be "electrical"
Col. 1, line 20, "industrail" should be "industrial"
Col. 1, line 21, "areperiodically" should be "are periodically"
Col. 1, line 24, after "pick-ups" insert ---are provided, along with a single counter. The pick-ups---
Col. 1, line 37, "failureor" should be "failure or"
Col. 1, line 59, "pulse" should be "pulses"
Col. 2, line 8, "aneother" should be "and other"
Col. 2, line 12, "coopertive" should be "cooperative"
Col. 2, line 14, "extneding" should be "extending"
Col. 2, line 51, "oles" should be "holes"
Col. 2, line 51, "provides" should be "provide"
Col. 2., line 57, "1" should be "12"
Col. 2, line 62, "MOunted" should be "Mounted"
Col. 3, line 24, "25in" should be "25 in"
Col. 3, line 29, "11" should be "110"
Col. 3, line 33, "nd" should be "and"
Col. 3, line 33, "swithced" should be "switched"
Col. 3, line 37, " SI" " should be " "SI" "
Col. 3, line 57, "Th" should be "The"
Col. 4, line 14, "bu" should be "but"
Col. 4, line 27, "perios" should be "periods"
Col. 4, line 54, "second column where it is blank should read "10 K ohms"
Col. 4, line 61, "$C_1$   .33u" should be "$C_1$   .33uf"
Col. 4, line 62, "$C_2$   .33u" should be "$C_2$   .33uf"
Col. 4, line 63, "$C_3$   .33u" should be "$C_3$   .33uf"
Col. 5, line 2, after "display" insert ---elements 118---
Col. 5, line 13, "themain" should be "the main"
Col. 5, line 22, after "in the light of" "th" should be "the"
Col. 5, line 41, "sai" should be "said"

UNITED STATES PATENT OFFICE
CERTIFICATE OF CORRECTION

Patent No. 3,783,248                    Dated January 1, 1974

Inventor(s)          Harry Sugden, Jr.

It is certified that error appears in the above-identified patent and that said Letters Patent are hereby corrected as shown below:

Col. 5, line 42, "pRoduced" should be "produced"
Col. 5, line 45, "respone" should be "response"
Col. 5, line 48, "saidotor" should be "said rotor"
Col. 5, line 53, "lectrical" should be "electrical"
Col. 6, line 1, "A" should be "The"
Col. 6, line 27, "respnse" should be "response"
Col. 6, line 31, after "set" "o" should be "of"
Col. 6, line 40, after ",said indicator" "eans" should be "means"
Col. 6, line 41, "powe" should be "power"
Col. 7, line 2, "respnse" should be "response"

Signed and sealed this 16th day of July 1974.

(SEAL)
Attest:

McCOY M. GIBSON, JR.           C. MARSHALL DANN
Attesting Officer              Commissioner of Patents